United States Patent
Voit et al.

(10) Patent No.: US 12,452,141 B2
(45) Date of Patent: Oct. 21, 2025

(54) SEASONAL PARAMETER PROVISIONING FOR ULTRA-SHORT-TERM FORECASTS

(71) Applicant: Cisco Technology, Inc., San Jose, CA (US)

(72) Inventors: Eric A Voit, Bethesda, MD (US); John Michael Lake, Cary, NC (US); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 18/493,369

(22) Filed: Oct. 24, 2023

(65) Prior Publication Data

US 2025/0023793 A1    Jan. 16, 2025

Related U.S. Application Data

(60) Provisional application No. 63/526,372, filed on Jul. 12, 2023.

(51) Int. Cl.
*H04L 41/147* (2022.01)
*H04L 41/16* (2022.01)

(52) U.S. Cl.
CPC ............ *H04L 41/147* (2013.01); *H04L 41/16* (2013.01)

(58) Field of Classification Search
CPC ........ H04L 41/147; H04L 41/16; G06F 18/24
See application file for complete search history.

(56) References Cited

U.S. PATENT DOCUMENTS

| 7,788,127 | B1 | 8/2010 | Gilgur et al. |
| 11,663,523 | B2* | 5/2023 | Polleri ............ G06F 8/30 706/12 |
| 2010/0094573 | A1 | 4/2010 | Yang et al. |
| 2016/0217384 | A1* | 7/2016 | Leonard ............. G06N 5/022 |
| 2019/0317826 | A1* | 10/2019 | Jain ............. G06F 9/5077 |
| 2020/0328947 | A1* | 10/2020 | Iwai ............ H04L 47/24 |
| 2021/0034278 | A1 | 2/2021 | Kaushik et al. |
| 2021/0390423 | A1 | 12/2021 | Latapie et al. |
| 2022/0058668 | A1 | 2/2022 | Wang et al. |
| 2022/0104127 | A1 | 3/2022 | Subramaniam et al. |
| 2022/0385542 | A1* | 12/2022 | Gokan Khan ...... H04L 41/0895 |

\* cited by examiner

*Primary Examiner* — Glenton B Burgess
*Assistant Examiner* — Jihad K Boustany
(74) *Attorney, Agent, or Firm* — Lee & Hayes, P.C.

(57) ABSTRACT

Techniques for ultra-short-term resource forecasting for a network device are described. A selection of a time series algorithm from a set of time series algorithms for determining capacity right-sizing of a local resource is received, the is selection based at least in part on current local traffic conditions. Based on current local traffic conditions, parameter values to be used in the algorithm are determined, the parameters are associated with the time series algorithm selection. A number of data points for input to the time series algorithm are determined, the data points are a sequence of values representing an amount of the local resource used by the network device at a point in time and are collected at predetermined time intervals. Based on a calculation of the time series algorithm using the number of data points and parameter values, the right-size capacity of the local resource for the network device is determined and provided.

20 Claims, 6 Drawing Sheets

SEASONAL PARAMETER PROVISIONING FOR ULTRA-SHORT-TERM FORECASTS

TECHNICAL FIELD

The present disclosure relates generally to ultra-short-term load forecasting for network devices. A time series algorithm is selected, parameters are tuned, and a number of input data points determined based on local network conditions.

BACKGROUND

In today's competitive market, networks are critical resources for organizations. The ability to transmit data accurately and in a timely manner, is vital to the success of any enterprise organization. Thus, it is essential that sufficient power capacity is available for network devices to ensure this critical resource functions properly at all times regardless of fluctuations in network demand. Typically, this means that a power capacity must be available for the highest conceivable requirement at all times. However, because network devices do not consume power resources at the highest available capacity at all times, a significant amount of resources are wasted, resulting in significant wasted cost to an enterprise organization.

In addition to monetary cost, the wasted power resources present added environmental concerns, and today many enterprise organizations are working to reduce the cost to the environment. Thus, capacity right-sizing, or optimizing resources allocated to a network device to ensure sufficient allocation for proper network performance with the least amount of cost, is essential for today's networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
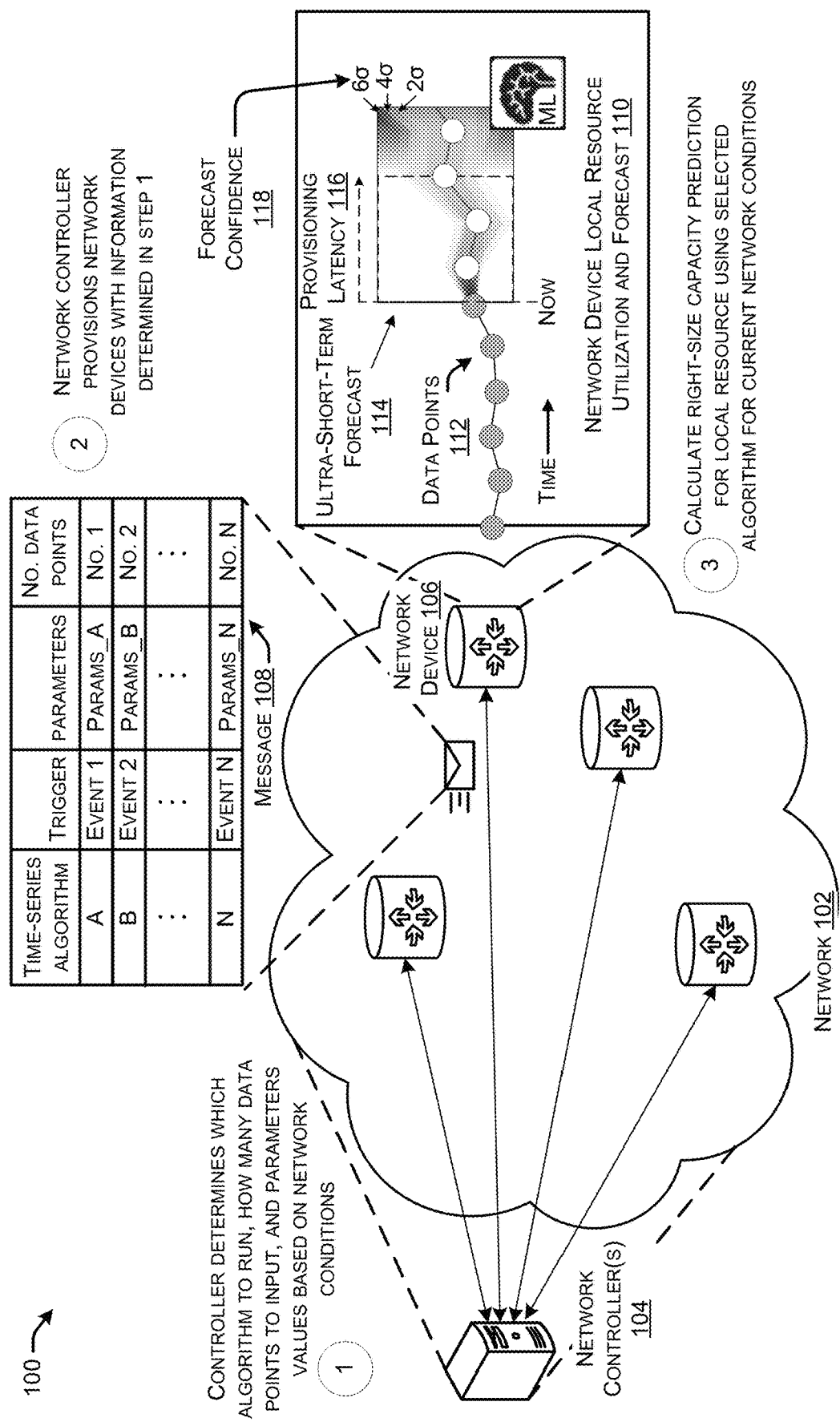
FIG. 1 illustrates an example environment that may implement various aspects of the technologies directed to embedding ultra-short-term forecasting capabilities in network devices and controllers to optimize resource management while meeting local traffic capacity needs.

This disclosure describes a method, performed at least in part by a network device for seasonal resource provisioning for an ultra-short-term forecast. The method includes receiving, from a network controller, a selection of a time series algorithm from a set of time series algorithms for determining capacity right-sizing of a local resource, the time series algorithm selection based at least in part on current local traffic conditions and wherein a right-size capacity is at least an amount of the local resource needed to ensure proper network functioning. In addition, the method includes receiving, from the network controller and based at least in part on current local traffic conditions, a determination of parameter values to be used in the algorithm, wherein the parameters are associated with the time series algorithm selection. The method also includes, receiving, from the network controller, a determination of a number of data points for input to the time series algorithm, wherein data points are a sequence of values representing an amount of the local resource used by the network device at a point in time that are collected at predetermined time intervals. The method may also include, determining, based at least in part on a calculation of the time series algorithm using the number of data points and parameter values, the right-size capacity of the local resource for the network device. Finally, the method includes providing the right-size capacity of the local resource for the network device.

Additionally, the techniques described herein may be performed by a system and/or device having non-transitory computer-readable media storing computer-executable instructions that, when executed by one or more processors, performs the method described above.

Example Embodiments

As described above, capacity right-sizing of resources is essential for network devices (e.g., routers, switches, etc.) in today's networking environment. Knowing how much of a resource (e.g., power) is needed at any given time is critical for proper network functioning. One common approach to resource capacity right-sizing is to utilize time series forecasting machine learning (ML) tools. Time series forecasting is a technique used to predict the future value of the resource over a period of time. The future value required is forecast or predicted based on what has already happened. Future events are predicted by analyzing the trends of the past. Some of the important factors in time series forecasting include, an amount of data, which is the amount of past data values collected at predetermined time intervals used for prediction analysis, and seasonality, which is a characteristic of the time series in which the data experiences regular and predictable changes that recur over a set period of time (e.g., year, season, month, week, day, etc.) The past data values may be collected at regularly spaced time intervals, or in bursts, or in some other pattern due to some kind of trigger event occurring.

However, one of the problems with regular time series approaches for capacity right-sizing of a network resource is that during times where a local network device is what happens when a spike in network activity occurs for an unforeseen reason within seconds that typical seasonality does not account for? Thus, there is a need to be able to predict, within a certain accuracy threshold, when a spike in network activity is coming and be able to supply a needed power capacity for the spike in time to sustain proper network functioning. Ultra-short-term time series forecasting can predict the value of future data in the coming seconds or less, thus, it may be used to predict the aforementioned "spikes" in network activity and ensure a sufficient amount of the resource is available for proper network functioning.

Load prediction capabilities, whether ultra-short-term or longer, can be embedded in network devices such as routers and switches, or in a network controller. However, the capabilities of routers (or other local network devices) and controllers are very different, and because of their inherently unique characteristics, ultra-short-term load forecasting presents a complex problem. If the forecasting is done at the controller level, the controller will receive measured data points via telemetry over tens of seconds (e.g., 30 second increments) and therefore, reaction speed to microbursts of activity resulting in an increase in resource capacity is likely to take minutes. As a result, to maintain an acceptable confidence (e.g., six sigma confidence) that there will be sufficient capacity during the sliding time window, it is not possible to be aggressive in saving resources. On the other hand, if the forecasting is done at a local network device level, for example at a router, router-based applications can handle a much quicker stream of measurement points. Thus, it is possible to react in a few seconds of changes to the measurements trendline slope. However, doing frequent complex time series analysis using ML tools at a local network device level is computationally expensive. The most desirable algorithms thus, might be unaffordable to run across a sufficiently large set of data to expose seasonality effects.

Knowing when to reduce power for a network device is easy as seasonality for routing environment happen at predictable times. However, knowing when to re-power them quickly in the event of an unforeseen surge in network activity is difficult. The techniques described herein virtually eliminate (to six sigma) the chance that the existing capacity is outstripped during some continuously sliding time window. The window is defined by the time it takes to recognize a change in utilization, and re-provision power capacity. These techniques provide for incorporating seasonality effects within a minimal computational footprint of a local network device (e.g., router), ensuring a maximized capacity savings that can be had by turning off equipment not required to support SLAs during a continuously sliding time window. By building out a networks embedded machine learning capabilities to include ultra-short-term load forecasting over a stream of power measurements, across both controllers and local network devices, a confidence that extra capacity is provisioned in advance of any six sigma event can be achieved.

Seasonality for routing environments happens at predictable times, thus it is not necessary to add seasonality costs to already complex time-series algorithms, and it is not necessary to consider the larger set of time-series data points needed to express seasonality. Instead, it is possible to achieve an aggressive power/capacity savings by dynamically optimizing across a set of both simple and complex algorithms and distributing them throughout a network so that reaction latency is not adversely impacted. Based on local network conditions, an algorithm is selected, or algorithm parameters tuned to minimize recurring calculations. The provisioning of these conditions can be done by a network controller, which overcomes the issue of a local network device not having the capacity to be embedded with complex ultra-short-term ML forecasting tools.

Effectively, a network controller determines what time series algorithm, from a set of computationally efficient time series algorithms for determining capacity right-sizing for a local network device, to be use based on different network conditions. In addition, the network controller can adjust the parameters or number of data points used as input to the time series algorithm. Optimizing the number of data points is critical for efficiency as the re-energization speed may be as short as a few second and this will allow a reaction in timeframes relevant to TCP window size. The network controller may then provision a local network device with the information that tells the local network device, which algorithm from a set of both simple and complex time series algorithms to use, a number of data points to use for input to the selected algorithm, and parameter values to use for the algorithm calculation, based on local network conditions at the local network device at any given time. Thus, based on local traffic thresholds and time, the local network device will know which algorithm to apply, how many data points to use for input to the algorithm, and how to tune the algorithm parameters to predict the ultra-short-term forecast for a local resource. Effectively, techniques described herein tune the brain cycles applied for the current network conditions. Thus, it is not necessary to consider the larger set of time-series data points needed to express seasonality. Instead, it is possible to achieve an aggressive power-capacity savings by designating a cost-effective algorithm to be run on a local network device, which is selected, run and tuned based on local conditions, and the provisioning of these conditions is done by the network controller. Thus, local network device CPU and memory usage can be optimized by utilizing the most efficient algorithm that satisfies the computation required.

Additionally, to further save CPU and memory usage by the local network device, in some instances, a new time series calculation may not be executed when the current data point measurement is not greater than the previous measurement, indicating that usage of the resource is not rising. A network controller may specify the conditions for which it is not necessary to execute the logic of local capacity ultra-short-term forecasting decisions. For example, if the capacity utilization is less than 50% or it is not higher than during the last evaluation, do not perform a forecast. Other conditions may be applied as determined by a network administrator.

In some examples, a network controller can tune the acceptable failure rate parameter. For example, a six sigma confidence that there will be sufficient capacity during a sliding time window, may become four sigma or even two sigma. For instance, when it is known that users are not in the office (e.g., in the middle of the night) very transient loss does not matter. In other words, if backups are run at night when nobody is in the office, temporarily constrained bandwidth is unlikely to be noticed by applications. This is because without interactive human traffic, the network can add capacity as soon as loss is experienced.

In some implementations, the techniques described herein may be implemented by a controller capacity management application which is able to incorporate multi-variable, seasonal data and estimate the most computationally efficient algorithm which can be applied on a specific network device so that the network device knows the exact conditions where it should add/remove (or power/depower) capacity at various times during a day. These algorithms are determined based on the probability of exceeding a capacity threshold during a repowering interval. Thus, seasonality aware algorithms need not be maintained on the network device, instead the seasonality effects are decomposed into smaller more efficient algorithms which are activated at different times of the day.

In some instances, pre-provisioned training data for each algorithm in a set of available algorithms, may be included. Additionally, a local network device may upload to the network controller, trained data to be shared across other routers in the network. Because a network controller will not see telemetry data at the frequency it will be visible on a local network device (e.g., router), in some examples, local time series conditions data may be collected and stored on the local network device. When an unexpected exceeding of capacity of a local resource (e.g., power capacity) is experienced, the local time series conditions data, collected just prior to the unexpected exceeding of capacity, may be provided as backpropagation training data which can be applied to a local cache for various types of time series analysis algorithms for the local network device, thus, tuning the algorithm parameters to promote increased accuracy in the ultra-short-term forecasting prediction. Alternately or in addition, when an event occurs when the local network device approaches, but does not quite exceed capacity of the local resource, the local time series conditions data, collected just prior may be provided as backpropagation training data which can be applied to a local cache for various types of time series analysis algorithms for the local network device. Each algorithm can then be examined after training to understand which algorithm best balances speed, resource usage, and accuracy, resulting in a dynamic selection of an efficient and effective curve fitting algorithm from across these constraints. This will enable equipment to be even more aggressive in capacity/power savings the more it learns about the local environment.

In some examples, external inputs or indicators to the local capacity predictions may be used in determining the right-size capacity of a local resource for the network device. For example, a calendaring system might have a virtual meeting scheduled, indicating that an enterprise organization may experience a spike in network activity at the scheduled meeting time. Locally served DNS queries might indicate coming network traffic expected for internal corporate video, YouTube, Netflix, etc.

FIG. 1 illustrates an example environment 100 that may implement various aspects of the technologies directed to embedding ultra-short-term load forecasting capabilities in routers and controllers to optimize resource management while meeting local traffic capacity needs. Environment 100 includes a network 102, a network controller 104, and multiple network devices such as network device 106. The network 102 may be a software defined wide area network (SD-WAN) that includes a centralized network controller 104 that orchestrates network functions. The network 102 may be made up of multiple network devices as shown, such as network device 106. Network device 106 may represent a router, switch, or any other appropriate network device that may make up a network fabric.

To implement techniques described herein for using a network controller 104 to minimize the brain cycles applied to power management within a network device 106 (e.g., router) based on historical and even current network conditions, at (1) the network controller 104 determines which algorithm, from a set of both simple and complex algorithms, to use to calculate ultra-short-term resource capacity predictions and determine capacity right-sizing for the resource (e.g., power capacity). For example, a controller capacity management application may incorporate multi-variable and seasonal data to estimate the most computationally efficient algorithm which can be applied on a specific router so that router knows the exact conditions where it should add/remove (or power/depower) capacity at various times during the day. The selected algorithms are determined based on the probability of exceeding a capacity threshold during a repowering interval. Thus, in some cases, seasonality aware algorithms need not be maintained on a router, instead the seasonality effects are decomposed into smaller more efficient algorithms which are activated at different times of the day and/or based on network condition triggers.

Additionally, the network controller 104 may tune an acceptable failure rate parameter. For example, allowing a six sigma confidence to become four sigma or even two sigma based on network conditions, or expected network condition. For instance, at times that users are known not to be in the office such as at night, when temporarily constrained bandwidth is unlikely to be noticed by applications, the acceptable failure rate will likely be different than at peak network usage time during the day when users are likely in the office and network traffic is at a high. In addition, the network controller 104 can determine when to refrain from executing a new time series calculation. For instance, if the current data measurement is not greater than the previous measurement, do not run the calculation. The network controller 104 may also determine other thresholds for triggers and conditional execution for each network device 106.

At (2) the information determined by the network controller 104 for each network device 106 is transmitted to the respective network device 106. For example, the information in the table shown included in message 108. Note, message 108 is but an example to illustrate how the network controller 104 provisions each network device 106 with instructions for determining a right-size capacity of a local resource for each individual network device 106 based on local network conditions. Message 108 includes the information the network controller 104 determined in step (1), such as which algorithms from a set of both simple and complex algorithms, to use to calculate ultra-short-term resource capacity predictions and determine capacity right-sizing for the resource (e.g., power capacity) according to trigger events (e.g., time of day) and conditional executions based on local network conditions. Additionally, the information in message 108 includes parameter values to be used in the selected algorithm as well as a number of data points for input to the algorithm for an ultra-short-term capacity forecast for a local resource.

At (3) the network device 106 calculates a right-size capacity prediction for a local resource using an ultra-short-term forecasting time series algorithm selected based on current network conditions. For example, a graph for network device local resource utilization and forecast 110, illustrates a number of measured data point 112 showing the actual utilization of a resource used by the network device 106 at predetermined time intervals up until the current moment in time, now. Based on the ultra-short-term forecasting algorithm selection as determined by the network controller 104, an ultra-short-term forecast 114 is calculated which has a provisioning latency 116 as shown. Also shown in the graph, is the extra capacity that would need to be provisioned in advance in order to have a confidence of two sigma, four sigma, or six sigma that there will be a sufficient amount of the resource to ensure proper functioning of network 102. The local network device 106 knows which algorithm to run based on a trigger event (e.g., time of day) or execution conditions, and the parameter values to use and the number of data points 112 to use for input based on the instructions provisioned by the network controller 104 as shown in message 108 and based on network conditions.

Figure 2:
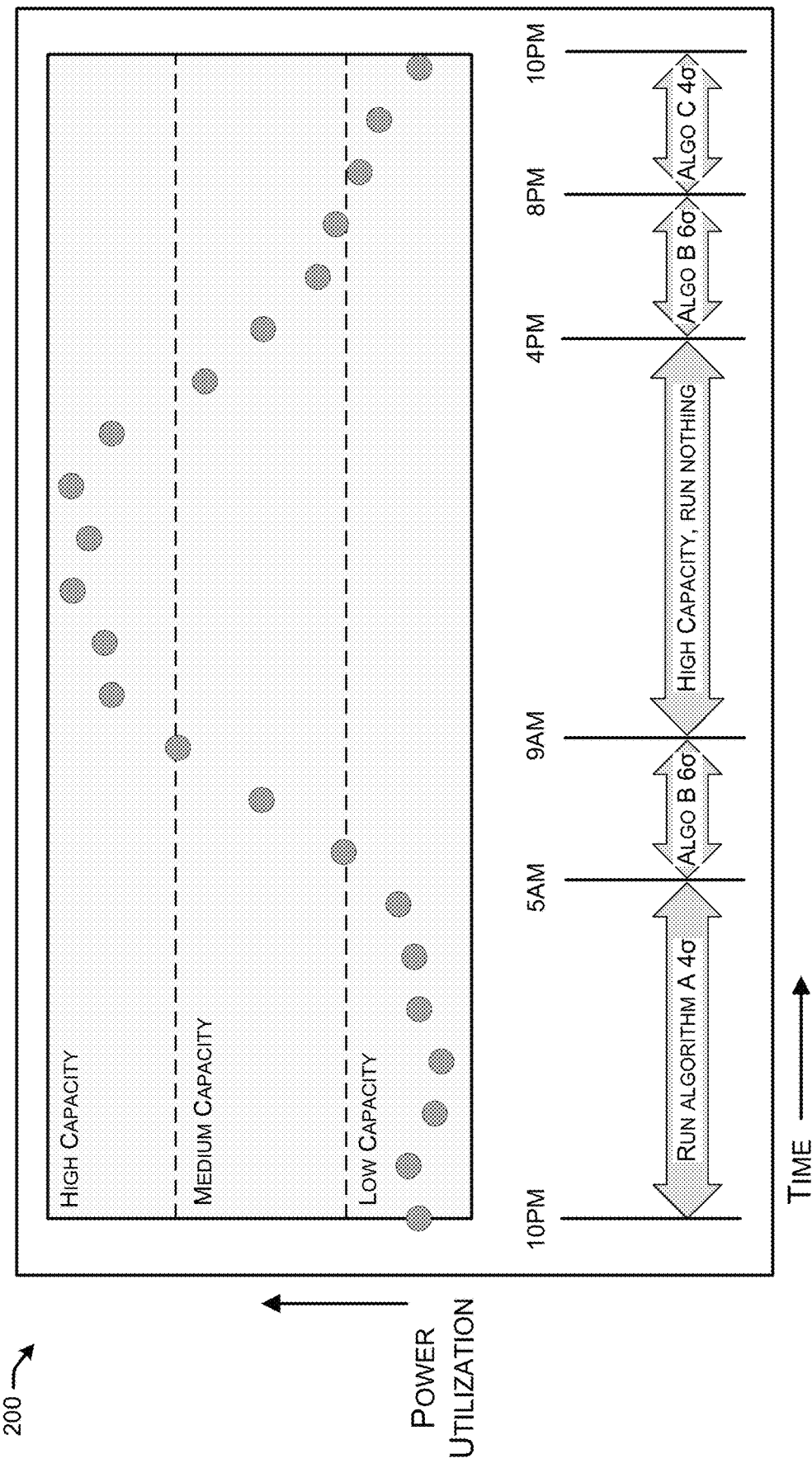
FIG. 2 illustrates an example of running various time series algorithms for ultra-short-term forecasting for power capacity for a network device based on time triggers.

FIG. 2 illustrates a graph 200 showing an example of running various time series algorithms for ultra-short-term forecasting for capacity right-sizing for a network device based on time triggers. The graph 200 is a series of data points of values representing an amount of power utilization of a network device collected at predetermined time intervals over a typical weekday. Users may generally be sleeping during the night which can be seen in the graph as the power utilization of the network device is at a low capacity between approximately 8 PM and 5 AM. During this time frame algorithm A (as determined by a network controller and provisioned to the network device for execution) is running and a failure parameter is set to four sigma, less than an optimal six sigma, as during the night when most user will be sleeping transient loss is not as critical. A medium power capacity is used during a time periods when users will be arriving at work and network activity will start to increase (approximately from 5 AM to 9 AM), and when users will be starting to leave work and decrease network usage (approximately 4 PM to 8 PM). At these ramp up and ramp down times, it is much more critical to ensure a sufficient power provisioning should an unexpected spike in activity occur, thus a different algorithm, algorithm B, is set to run during these times and a failure parameter tuned to ensure a six sigma confidence that sufficient power will be provisioned in any time window. Finally, during a time period when nearly all users will be working, a high capacity of power utilization of the network device is shown during the time period from 9 AM to 4 PM. AT this time, the power utilization is already at a highest capacity available, thus there is no reason to burden the network device by using excess CPU and memory resources to run any time-series algorithm for ultra-short-term provisioning.

The graph illustrates how the techniques described herein can be used to dynamically optimize across a set of both simple and complex algorithms. Performing time series predictions can be rather computationally complex, however there are a plurality of algorithms with optimizations to different uses, each with several parameters. By applying different algorithms, tuning the relevant parameters, and determining an appropriate number of data points for input, based on network conditions or times triggers as shown, concerns like seasonality may be taken into account without always needing to apply the most computationally complex time series algorithms that have seasonality built in. Instead, using multiple different algorithms based on the current network activity as shown in FIG. 2, can virtually guarantee, to a six sigma confidence, extra power capacity in advance of a spike in utilization during a continuously sliding time window. In addition to executing various time series algorithms (determined by a network controller and executed on a local network device) based on current local network conditions, by implementing other conditional execution triggers (e.g., do not execute a new time series calculation if the current measurement is not greater than the previous measurement), a right-size capacity for a resource for a network device can be provisioned, where a right-size capacity is at least an amount of the resource needed to ensure proper network functioning, thus, minimizing any resource waste.

Figure 3:
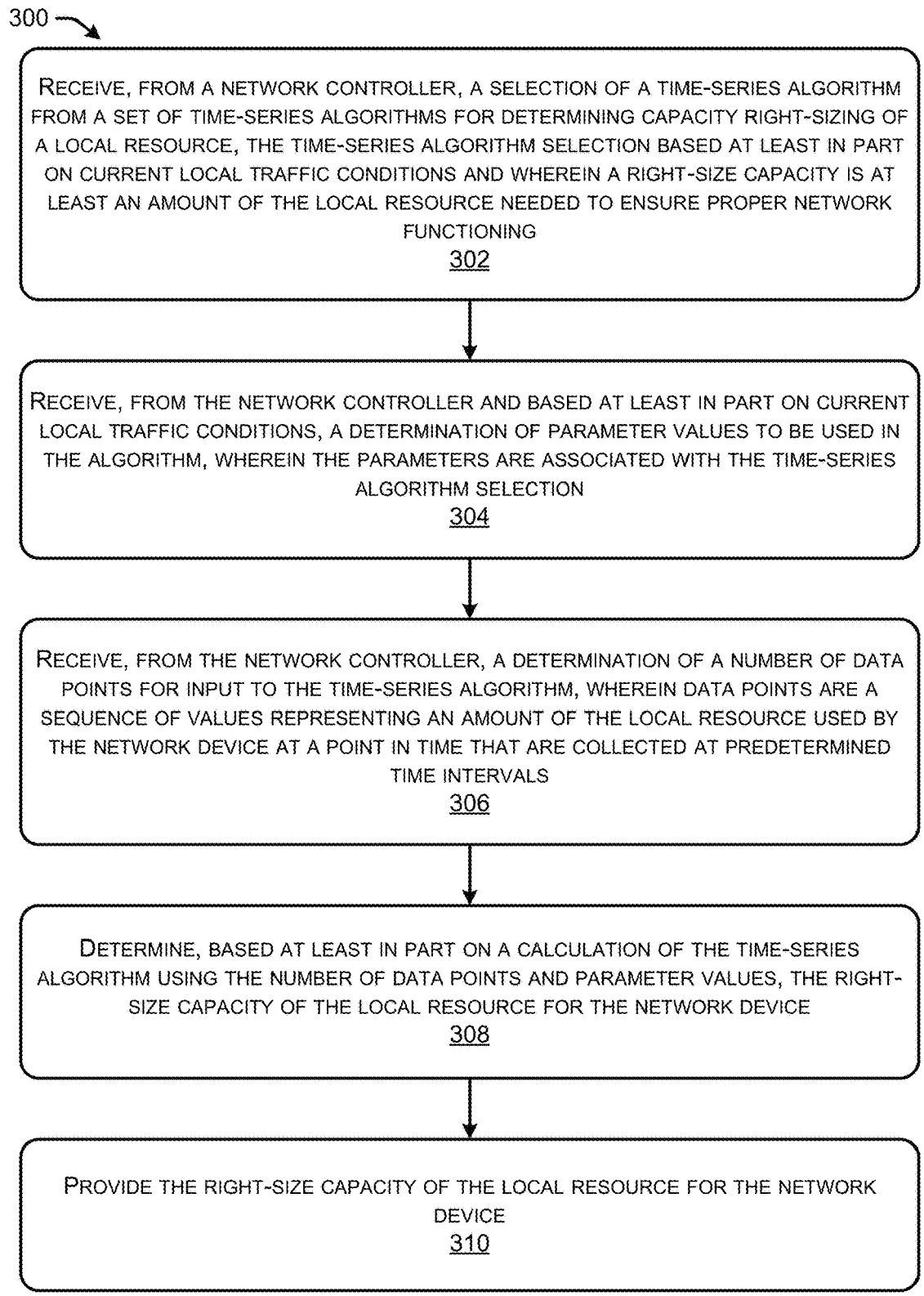
FIG. 3 is a flow diagram illustrating an example method associated with the techniques described herein for provisioning an ultra-short-term forecast for a local resource for a network device.

FIG. 3 is a flow diagram illustrating an example method 300 associated with the techniques described herein for seasonal resource provisioning for ultra-short-term forecasting and capacity right-sizing using ML time series algorithm tools. Example method 300 illustrates aspects of the functions performed by network device 106 as described with reference to FIG. 1. The logical operations described herein with respect to FIG. 3 may be implemented (1) as a sequence of computer-implemented acts or program modules running on a computing system and/or (2) as interconnected machine logic circuits or circuit modules within the computing system. In some examples, the method(s) 300 may be performed by a system comprising one or more processors and one or more non-transitory computer-readable media storing computer-executable instructions that, when executed by the one or more processors, cause the one or more processors to perform the method(s) 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302 a network device receives, from a network controller, a selection of a time series algorithm from a set of time series algorithms for determining capacity right-sizing of a local resource, the time series algorithm selection is based at least in part on current local traffic conditions and the right-size capacity is a capacity that is at least an amount of the local resource needed to ensure proper network functioning. For example, with reference to FIG. 1 the network controller 104 determines which time series algorithm, from a set of both simple and complex time series algorithms, that the network device 106 should execute based on network conditions. For instance, during work hours when network activity is high run one algorithm but at night when network activity is low run a different algorithm. In addition, the algorithm selection may be different for different network devices, as the algorithm selection is based on current local network traffic conditions.

At operation 304 the network device receives, from the network controller and based at least in part on current local traffic conditions, a determination of parameter values to be used in the algorithm, the parameters are associated with the time series algorithm selection. For example, with reference to FIG. 1 the network controller 104 may tune parameter values associated with the selected time series algorithm based on local network conditions. FIG. 1 illustrates this information regarding parameter values being transmitted from the network controller 104 to the network device 106 in message 108.

At operation 306 the network device receives, from the network controller, a determination of a number of data points for input to the time series algorithm, the data points are a sequence of values representing an amount of the local resource used by the network device at a point in time that are collected at predetermined time intervals. For example, with reference to FIG. 1 the network controller 104 can determine an appropriate number of data points for input to the selected time series algorithm based on local network condition and transmits this information to network device 106 in message 108.

At operation 308, based at least in part on a calculation of the time series algorithm using the number of data points and parameter values, the network device determines the right-size capacity of the local resource for the network device. For example, in FIG. 1 at (3) the network device 106 determines a right-size capacity prediction for the local resource using the algorithm selection determined by the network controller 104 and using the parameter values and number of data points (e.g., data points 112) as determined by the network controller 104.

At operation 310 the right-size capacity of the local resource is provided for the network device. In FIG. 1, once the capacity right-sizing is determined by the network device 106 by executing the algorithm, parameter values, and number of data points determined by the network controller 104, a right-size capacity of the local resource is provided for the network device 106. The right-size capacity may depend on a level of confidence required at the time. For instance, different capacities of the local resource are required for a two sigma, four sigma, and six sigma confidence as shown by the forecast confidence 118 in FIG. 1.

Figure 4:
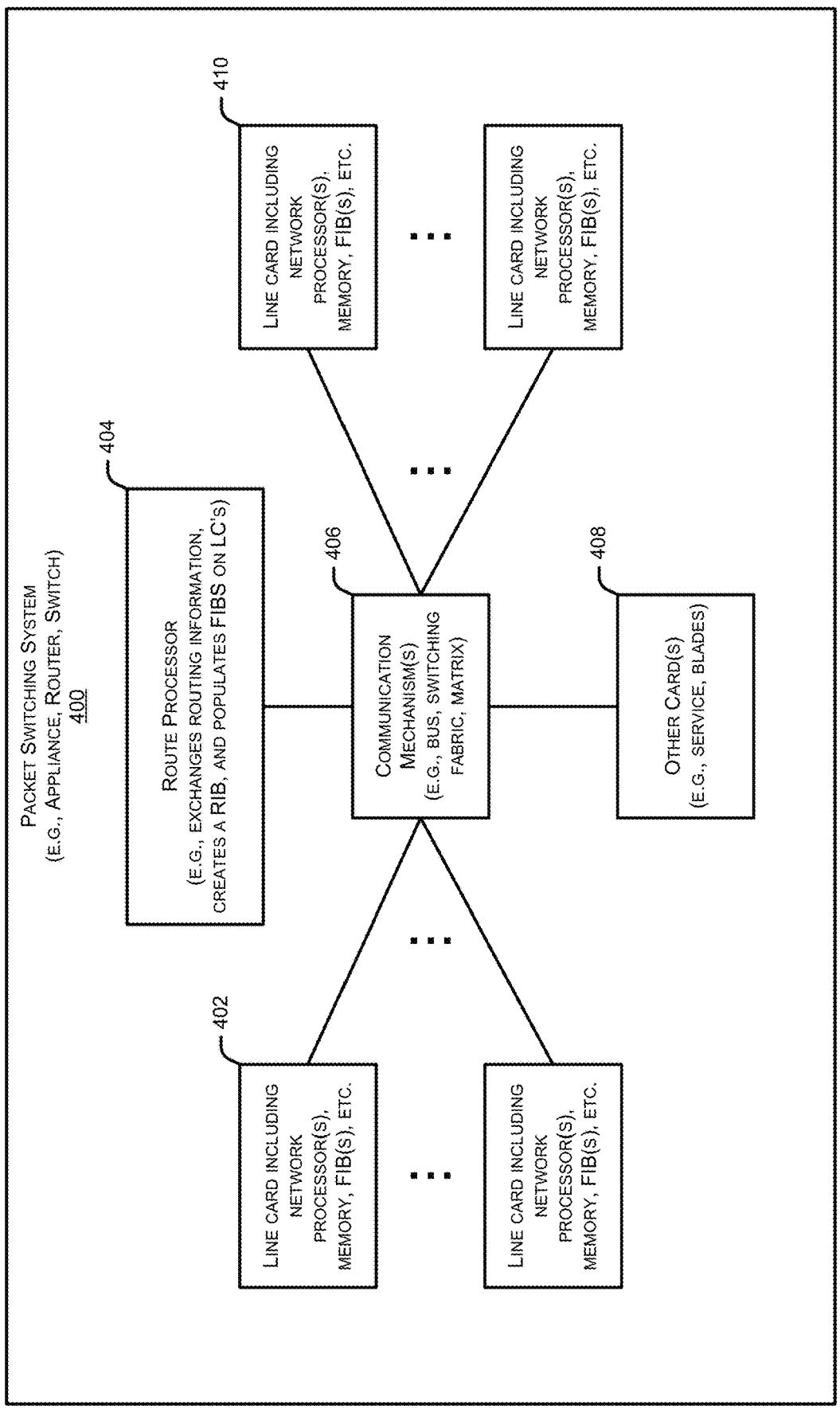
FIG. 4 illustrates a block diagram illustrating an example packet switching system that can be utilized to implement various aspects of the technologies disclosed herein.

FIG. 4 illustrates a block diagram illustrating an example packet switching device (or system) 400 that can be utilized to implement various aspects of the technologies disclosed herein. In some examples, packet switching device(s) 400 may be employed in various networks, such as, for example, network device 106 described with respect to FIG. 1.

In some examples, a packet switching device 400 may comprise multiple line card(s) 402, 410, each with one or more network interfaces for sending and receiving packets over communications links (e.g., possibly part of a link aggregation group). The packet switching device 400 may also have a control plane with one or more processing elements for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may comprise hardware-based communication mechanism 406 (e.g., bus, switching fabric, and/or matrix, etc.) for allowing its different entities, line cards 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching device 400.

Figure 5:
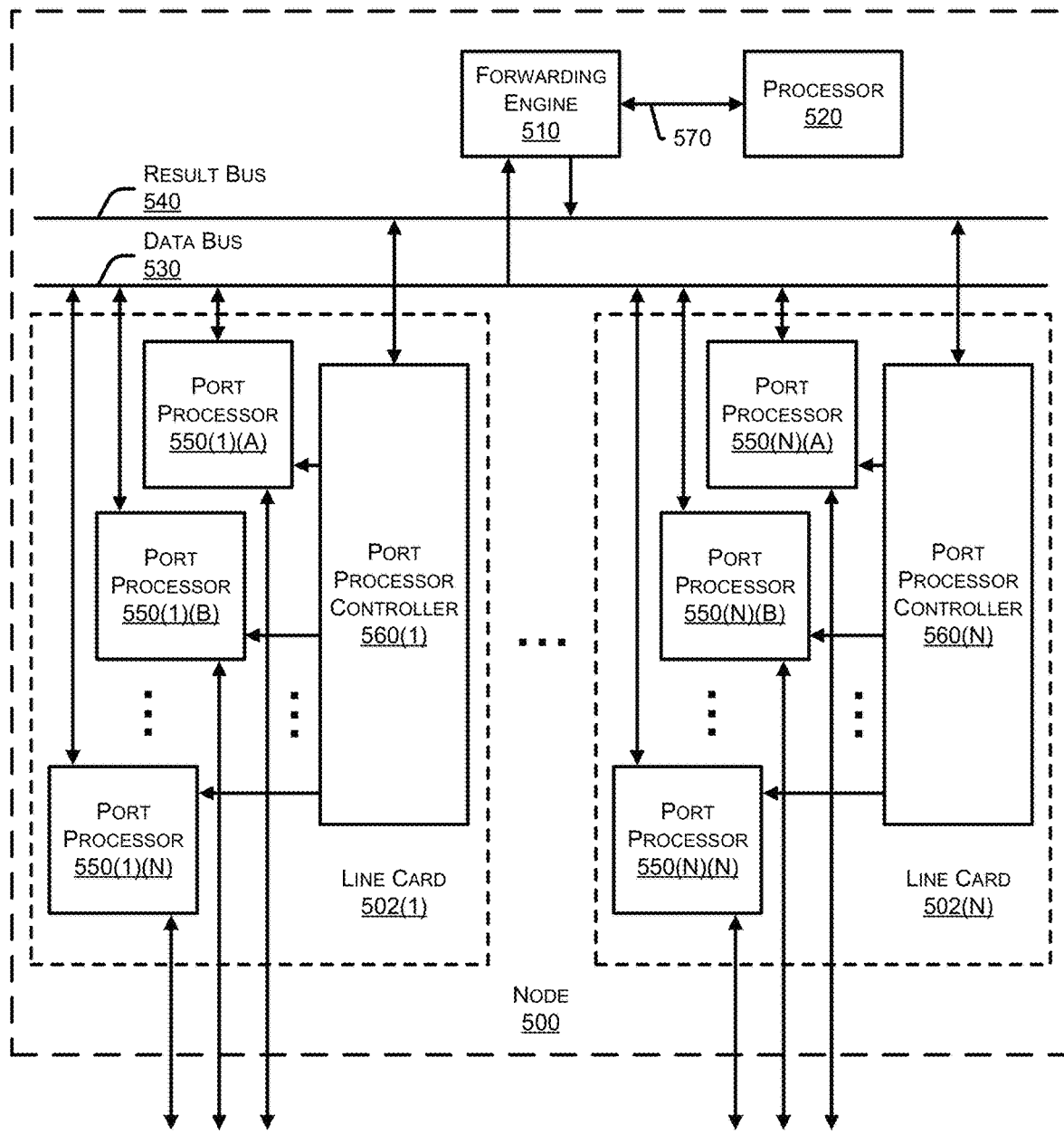
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example, the network 102 as described with respect to FIG. 1.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560 (1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or may add packet security information in order to secure the packet. On a node 500 sourcing such a packet or packet and header, this processing may include, for example, encryption of some or all of the packets or packet and header's information, the addition of a digital signature, and/or some other information and/or processing capable of securing the packet or packet and header. On a node 500 receiving such a processed packet or packet and header, the corresponding process may be performed to recover or validate the packets or packet and header's information that has been secured.

Figure 6:
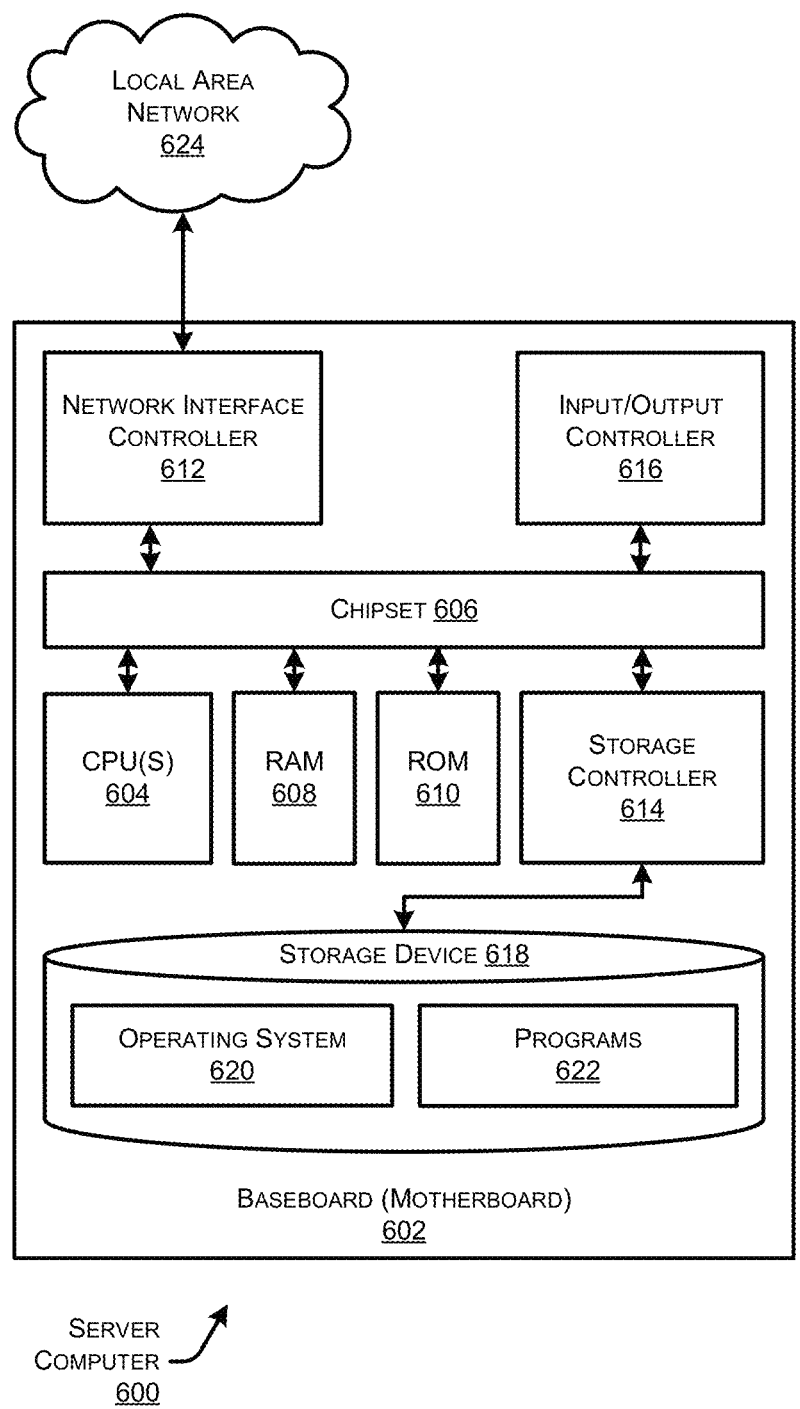
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to a network controller 104, network device 106, the packet switching system 400, and/or the node 500 described herein with respect to FIGS. 1, 4 and 5, respectively.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 624. The chipset 606 can include functionality for providing network connectivity through a NIC 612, such as a gigabit Ethernet adapter. The NIC 612 is capable of connecting the computing device 600 to other computing devices over the network 624. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the network device 106 and the network controller 104, and or any components included therein, may be supported by one or more devices similar to computing device 600. Stated otherwise, some or all of the operations performed by the network device 106 and the network controller 104 and or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIG. 3. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least in part by a network device for seasonal resource provisioning for an ultra-short-term forecast, the method comprising:
    receiving, from a network controller, a selection of a time series algorithm, for determining capacity right-sizing of a local resource, from a set of time series algorithms, wherein the time series algorithm is a computationally efficient algorithm based at least in part on current local traffic conditions and wherein a right-size capacity is at least an amount of the local resource needed to ensure proper network functioning;
    receiving, from the network controller, an instruction to run the time series algorithm when a local traffic condition trigger event occurs, wherein the instruction includes a determination of parameter values associated with the time series algorithm selection to be used in the time series algorithm;
    receiving, from the network controller, a determination of a number of data points for input to the time series algorithm, wherein data points are a sequence of values representing an amount of the local resource used by the network device at a point in time that are collected at predetermined time intervals;
    determining, based at least in part on a calculation of the time series algorithm using the number of data points and parameter values and in response to the local traffic condition trigger event occurring, the right-size capacity of the local resource for the network device; and
    providing the right-size capacity of the local resource for the network device.

2. The method of claim 1, further comprising receiving, from the network controller, an acceptable failure rate parameter for the time series algorithm, the acceptable failure rate parameter based at least in part on current local traffic conditions.

3. The method of claim 1, further comprising:
    determining whether a current data point value collected is greater than a previous data point value;
    based at least in part on determining that the current data point value is not greater than the previous data point value, continue providing the right-size capacity of the local resource for the network device; and
    based at least in part of determining that the current data point value is greater than the previous data point value, execute a new time series calculation to determine a new right-size capacity of the local resource for the network device.

4. The method of claim 1, wherein an individual time series algorithm of the set of time series algorithms includes pre-provisioned training data.

5. The method of claim 1, further comprising uploading, by the network device and to the network controller, trained data for distribution to other network devices.

6. The method of claim 1, further comprising:
    storing local time series conditions data in the network device that is collected prior to an unexpected exceeding of capacity of the local resource on the network device; and
    providing the local time series conditions data as back-propagation training data for the set of time series algorithms for the network device.

7. The method of claim 1, further comprising including external indications of near future events for determining the right-size capacity of the local resource for the network device.

8. A system comprising:
    one or more processors; and
    one or more computer-readable media storing computer-executable instructions that, when executed by the one or more processors, cause the one or more processors to perform operations comprising:
        receiving, by a network device and from a network controller, a selection of a time series algorithm, for determining capacity right-sizing of a local resource, from a set of time series algorithms, wherein the time series algorithm is a computationally efficient algorithm based at least in part on current local traffic conditions and wherein a right-size capacity is at least an amount of the local resource needed to ensure proper network functioning;
        receiving, by the network device and from the network controller, an instruction to run the time series algorithm when a local traffic condition trigger event occurs, wherein the instruction includes a determination of parameter values associated with the time series algorithm selection to be used in the time series algorithm;
        receiving, by the network device and from the network controller, a determination of a number of data points for input to the time series algorithm, wherein data points are a sequence of values representing an amount of the local resource used by the network device at a point in time that are collected at predetermined time intervals;
        determining, based at least in part on a calculation of the time series algorithm using the number of data points and parameter values and in response to the local traffic condition trigger event occurring, the right-size capacity of the local resource for the network device; and
        providing, the right-size capacity of the local resource for the network device.

9. The system of claim 8, the operations further comprising receiving, by the network device and from the network controller, an acceptable failure rate parameter for the time series algorithm, the acceptable failure rate parameter based at least in part on current local traffic conditions.

10. The system of claim 8, the operations further comprising:
    determining whether a current data point value collected is greater than a previous data point value;
    based at least in part on determining that the current data point value is not greater than the previous data point value, continue providing the right-size capacity of the local resource for the network device; and
    based at least in part of determining that the current data point value is greater than the previous data point value, execute a new time series calculation to determine a new right-size capacity of the local resource for the network device.

11. The system of claim 8, wherein an individual time series algorithm of the set of times series algorithms includes training data based on historical consumption of the local resource for the network device.

12. The system of claim 8, the operations further comprising uploading, by the network device and to the network controller, trained data for distribution to other network devices.

13. The system of claim 8, the operations further comprising:
    storing local time series conditions data in the network device that is collected prior to an event that approaches an unexpected exceeding of capacity of the local resource on the network device; and
    providing the local time series conditions data as back-propagation training data for the set of time series algorithms for the network device.

14. The system of claim 8, the operations further comprising including external indications of near future events for determining the right-size capacity of the local resource for the network device.

15. One or more non-transitory computer-readable media storing instructions that, when executed, cause one or more processors to perform operations comprising:
    receiving, by a network device and from a network controller, a selection of a time series algorithm, for capacity right-sizing of a local resource, from a set of time series algorithms, wherein the time series algorithm is a computationally efficient algorithm based at least in part on current local traffic conditions and wherein a right-size capacity is at least an amount of the local resource needed to ensure proper network functioning;
    receiving, by the network device and from the network controller, an instruction to run the time series algorithm when a local traffic condition trigger event occurs, wherein the instruction includes a determination of parameter values associated with the time series algorithm selection to be used in the time series algorithm;
    receiving, by the network device and from the network controller, a determination of a number of data points for input to the time series algorithm, wherein data points are a sequence of values representing an amount of the local resource used by the network device at a point in time that are collected at predetermined time intervals;
    determining, based at least in part on a calculation of the time series algorithm using the number of data points and parameter values and in response to the local traffic condition trigger event occurring, the right-size capacity of the local resource for the network device; and
    providing, the right-size capacity of the local resource for the network device.

16. The one or more non-transitory computer-readable media of claim 15, the operation further comprising receiving, by the network device and from the network controller, an acceptable failure rate parameter for the time series algorithm, the acceptable failure rate parameter based at least in part on current local traffic conditions.

17. The one or more non-transitory computer-readable media of claim 15, the operation further comprising:
    determining whether a current data point value collected is greater than a previous data point value;
    based at least in part on determining that the current data point value is not greater than the previous data point value, continue providing the right-size capacity of the local resource for the network device; and
    based at least in part of determining that the current data point value is greater than the previous data point value, execute a new time series calculation to determine a new right-size capacity of the local resource for the network device.

18. The one or more non-transitory computer-readable media of claim 15, wherein an individual time series algorithm of the set of time series algorithms includes pre-provisioned training data.

19. The one or more non-transitory computer-readable media of claim 15, the operation further comprising uploading, by the network device and to the network controller, trained data for distribution to other network devices.

20. The one or more non-transitory computer-readable media of claim 15, the operation further comprising:
    storing local time series conditions data in the network device that is collected prior to an unexpected exceeding of capacity of the local resource on the network device; and
    providing the local time series conditions data as back-propagation training data for the set of time series algorithms for the network device.

* * * * *